Patented Nov. 27, 1934

1,982,159

UNITED STATES PATENT OFFICE 1,982,159

AZO-DYESTUFFS OF THE STILBENE SERIES AND PROCESS OF MAKING SAME

Alfred Gressly, Frankfort-on-the-Main-Fechenheim, Germany, assignor to General Aniline Works, Inc., New York, N. Y., a corporation of Delaware No Drawing. Application May 2, 1933, Serial No. 669,071. In Germany May 11, 1932

10 Claims. (Cl. 260—69)

This invention relates to azo-dyestuffs of the stilbene series and to a process of making same.

The process of the invention comprises subjecting the dyestuffs obtained by condensing dinitro-stilbene- (or -dibenzyl-) disulfonic acid or a product of the alkaline conversion of nitrotoluene-sulfonic acid with amino-azo-compounds to the action of alkaline reducing agents and to a purifying process.

The said two steps, reduction and purification, may be carried out in any sequence. The purifying process may be an oxidation especially when strong reducing agents are previously used. Otherwise it may consist in a fractional separation for instance a partial precipitation by means of common salt.

The dyestuffs thus obtained whereof exact structural formulae cannot be given show orange to red shades. They surpass the starting dyestuffs by a higher intensity, more reddish and brighter shades and by a remarkable fastness, especially to chlorine and in some cases to light.

The difference of properties between the starting material and the final products is caused by the combination of the reducing action (deepening the shade and turning it to red) and the purifying action (removing byproducts of lower fastness).

In order to further illustrate my invention the following examples are given, the parts being by weight and all temperatures in centigrade degrees; but it is, however, to be understood that my invention is not limited to the particular products nor reacting conditions mentioned therein.

Example 1

The dyestuff, obtained by condensing according to known methods 47.4 parts of the sodium salt of dinitro-stilbene-disulfonic acid and 32 parts of 4-amino-azo-benzene-4'-sulfonic acid in an alkaline solution, is dissolved with 50 parts of a caustic soda lye of 33° Bé. and 2000 parts of warm water and after the addition of 5 parts of sodium sulfide of 60% it is warmed for about half an hour to 70–80° while stirring. Then the mass is oxidized by the addition of sodium hypochlorite, corresponding to 33 parts of active chlorine, while warming for about half an hour to 80–90°. After neutralizing the reaction mixture by means of mineral acid the dyestuff is precipitated by the addition of common salt and separated in the usual manner. The dried dyestuff represents a brown powder, easily soluble in water with an orange color and dissolving in concentrated sulfuric acid with a blue color. Cotton is dyed in a soda-alkaline bath clear orange shades, fast to chlorine and light.

Example 2

64.5 parts of dinitro—stilbene-disulfonic acid and 46.8 parts of 4-amino-azo-benzene-4'-sulfonic acid are condensed according to known methods while adding 24 parts of caustic soda. 11.7 parts of dextrose are added to the condensation mass which is maintained for 3 hours at 80–85° while stirring. After diluting to 2500 parts the mass is neutralized with about 40 parts of hydrochloric acid of 19° Bé. and precipitated by means of about 240 parts of common salt. Then the mass is cooled down during some hours to 40°, filtered off by suction and washed with hydrochloric acid. The product thus obtained is practically identical to the dyestuff of Example 1.

Example 3

The product obtained in a known manner by alkaline condensation of 47.4 parts of the sodium salt of dinitro-stilbene-disulfonic acid with 32 parts of 2-methyl-4-amino-azo-benzene-2'-sulfonic acid, is dissolved in about 1800 parts of water and 60 parts of caustic soda lye of 33° Bé. and this solution is warmed after the addition of 12 parts of dextrose while stirring for 3–4 hours to about 80–85°. After neutralizing the reaction mixture is precipitated by means of common salt and separated. The paste is dissolved in about 1500 parts of water while adding 30 parts of soda lye of 33° Bé. and oxidized, as described in Example 1, by the addition of a solution of sodium hypochlorite, corresponding to 30 parts of chlorine and warming for about half an hour to 80–90°. The mass is worked up as described in Example 1. The dyestuff represents when dry a brown powder, easily soluble in water with an orange color, dissolving in concentrated sulfuric acid with a blue color and dyeing cotton more reddish and purer full orange shades than the dyestuff of the original condensation product which shades show an improved fastness to chlorine and light.

Example 4

Instead of the condensation product of dinitro-stilbene-disulfonic acid and 2-methyl-4-amino-azo-benzene-2'-sulfonic acid, equivalent quantities of the condensation products of dinitro-stilbene-disulfonic acid and the amino-azo-dyestuffs:

a. 2-methyl-5-methoxy-4-amino-azo-benzene-4'-sulfonic acid, or
b. 2-methyl-5-methoxy-4-amino-azo-benzene-2'-sulfonic acid, or
c. 2-methyl-5-methoxy-4'-ethoxy-4-amino-azo-benzene-2'-sulfonic acid or other analogous amino-azo-dyestuffs of the cresidine series yield by subsequent reduction and oxidation according to Example 1 or 3 dyestuffs, dyeing reddish orange shades of the same excellent properties.

Example 5

By after-treating the condensation products of dinitro-stilbene-disulfonic acid and such amino-azo-dyestuffs, as are obtainable from diazotized aniline-sulfonic acids or their homologues and amino-hydroquinone-dialkyl-ethers, with reducing and oxidizing agents, dyestuffs dyeing red shades and having similar properties are obtained.

For example the alkaline condensation product of 47.4 parts of the sodium salt of dinitro-stilbene-disulfonic acid and 40 parts of 2.5-dimethoxy-4-amino-azo-benzene-4'-sulfonic acid is treated with an alkaline solution of dextrose and subsequently oxidized with a solution of sodium hypochlorite according to Example 3. In this manner a dyestuff is obtained which dyes cotton deeper red shades than the dyestuff of the original condensation product which shades are of the same improved fastness qualities as the dyestuffs of the foregoing examples.

Example 6

When in the described examples reduction and oxidation are carried out in a reverse sequence, practically the same effect is obtained. By alkaline oxidation for example of the starting dyestuff of dinitro-stilbene-disulfonic acid and 4-amino-azo-benzene-4'-sulfonic acid, used in Example 1, at first a purer dyestuff is obtained, dyeing cotton the same shade. By subsequent alkaline reduction, for example by means of sodium sulfide or dextrose, a dyestuff is obtained which dyes full bright orange shades of the named excellent qualities.

Example 7

Instead of the condensation products from dinitro-stilbene-disulfonic acid and amino-azo-compounds, used as starting compounds in the foregoing examples, also the dyestuffs known by U. S. Patent No. 951,047 (obtainable by transforming p-nitro-toluene-sulfonic acid with soda lye and by condensing the yellow transformation product with amino-azo-dyestuffs) may be used as starting-compounds.

40 parts of the yellow-orange dyestuff, obtained by alkaline condensation of 4-amino-azo-benzene-4'-sulfonic acid with the reaction product of soda lye on p-nitro-toluene-sulfonic acid, are dissolved in about 700 parts of water and 50 parts of caustic soda lye of 33° Bé. and reduced in the warm with a solution of 2.3 parts of sodium sulfide of 60%. Thereby a new, essentially more reddish dyestuff is formed.

By treating this dyestuff with oxidizing agents, for example with sodium hypochlorite or chlorine in an alkaline medium, a new compound is obtained forming dyeings on cotton of an improved fastness to chlorine and clearness of shade.

Example 8

When using in the foregoing examples as starting dyestuffs condensation products of 1 molecular proportion of dinitro-stilbene-disulfonic acid with 2 molecular proportions or approximately 2 molecular proportions of the amino-azo-dyestuff, by subsequent reduction and oxidation similar results are obtained. Also in these cases the reduction causes the formation of dyestuffs dyeing deeper reddish shades, whereas the oxidation renders them clearer and purer.

For example the dyestuff-paste, obtained by condensing 47.3 parts of the sodium salt of dinitro-stilbene-disulfonic acid and 48 parts of 2-methyl-4-amino-azo-benzene-4'-sulfonic acid in diluted caustic soda lye, is dissolved with 50 parts of caustic soda lye of 33° Bé. in about 2000 parts of hot water and treated with 5 parts of sodium sulfide of 60% for about half an hour at 70–80°. Then the mixture is oxidized as described in Example 1 with a solution of sodium hypochlorite, corresponding to 33 parts of active chlorine, and worked up in the usual manner. The dyestuff dyes cotton, in comparison to the more yellowish starting dyestuff, full orange shades of the improved qualities referred to in the foregoing examples.

I claim:

1. A process for the production of azo dyestuffs of the stilbene series which comprises the steps of reacting the condensation products of dinitro-stilbene-disulfonic acid and amino-azo-compounds of the benzene series with alkaline reducing agents, treating the products obtained from the first step with oxidizing agents, and fractionally precipitating with a salt.

2. The azo dyestuffs of the stilbene series prepared by the process of claim 1, the said azo dyestuffs being distinguished from the original condensation products in that they are of higher intensity, redder and brighter shades, and of a more remarkable fastness, especially to chlorine and light.

3. A process for the production of azo dyestuffs of the stilbene series which comprises reacting the condensation products of dinitro-stilbene-disulfonic acid and amino-azo-compounds of the benzene series with alkaline reducing agents and then treating with oxidizing agents.

4. A process for the production of azo dyestuffs of the stilbene series which comprises reacting the condensation products of dinitro-stilbene-disulfonic acid and amino-azo-compounds of the benzene series with alkaline reducing agents and fractionally precipitating with common salt.

5. A process for the production of azo dyestuffs of the stilbene series which comprises heating the product obtained by condensing dinitro-stilbene-disulfonic acid with 2.5-dimethoxy-4-amino-azo-benzene-4'-sulfonic acid in a solution of sodium sulfide and thereafter adding sodium hypochlorite.

6. The azo dyestuff of the stilbene series prepared by the process of claim 5, the said azo dyestuff dyeing red shades which are distinguished from the shades of the original condensation product in that they are redder and of improved fastness.

7. A process for the production of azo dyestuffs of the stilbene series which comprises heating the product obtained by condensing dinitro-stilbene-disulfonic acid with 2-methyl-5-methoxy-4'-ethoxy-4-amino-azo-benzene-4'-sulfonic acid in a solution of sodium sulfide and thereafter adding sodium hypochlorite.

8. The azo dyestuff of the stilbene series prepared by the process of claim 7, the said azo dyestuff dyeing reddish orange shades which are distinguished from the shades of the original condensation product in that they are more reddish and of an improved fastness.

9. A process for the production of azo dyestuffs of the stilbene series which comprises heating the product obtained by condensing dinitro-stilbene-disulfonic acid with 4-amino-azo-benzene-4'-sulfonic acid in an alkaline solution with dextrose and fractionally precipitating with common salt.

10. The azo dyestuff of the stilbene series prepared by the process of claim 9, the said azo dyestuff dyeing clear orange shades which are distinguished from the shades of the original condensation product in that they are more reddish and of an improved fastness.

ALFRED GRESSLY.